(12) United States Patent
Landers et al.

(10) Patent No.: US 7,810,986 B2
(45) Date of Patent: Oct. 12, 2010

(54) SYSTEMS AND METHODS FOR LIQUID DOSING OF MATERIAL IN A BLENDER SYSTEM

(75) Inventors: Alan Landers, Suwanee, GA (US); John Beal, Atlanta, GA (US); Kevin Pittman, Newnan, GA (US)

(73) Assignee: Process Control Corporation, Atlanta, GA (US)

( * ) Notice: Subject to any disclaimer, the term of this patent is extended or adjusted under 35 U.S.C. 154(b) by 1048 days.

(21) Appl. No.: 11/285,618

(22) Filed: Nov. 21, 2005

(65) Prior Publication Data
US 2007/0115753 A1    May 24, 2007

(51) Int. Cl.
B29B 7/94   (2006.01)

(52) U.S. Cl. ............... 366/76.91; 366/76.93; 366/137.1; 366/167.1; 366/178.1; 366/181.1; 366/183.1

(58) Field of Classification Search ............... 366/76.3, 366/76.4, 76.6, 76.9–76.93, 137.1, 178.1–178.3, 366/181.1, 183.1, 167.1, 173.1–173.2
See application file for complete search history.

(56) References Cited

U.S. PATENT DOCUMENTS

| | | | | | |
|---|---|---|---|---|---|
| 2,126,911 | A | * | 8/1938 | Mullen | 516/77 |
| 2,460,884 | A | * | 2/1949 | Hjort et al. | 241/1 |
| 2,746,728 | A | * | 5/1956 | Pomerleau | 239/421 |
| 3,228,065 | A | * | 1/1966 | Cournoyer et al. | 366/76.91 |
| 3,378,235 | A | * | 4/1968 | Udy et al. | 366/154.2 |
| 3,477,698 | A | * | 11/1969 | Webster et al. | 366/76.91 |
| 3,542,342 | A | * | 11/1970 | Barron | 366/178.1 |
| 3,814,388 | A | * | 6/1974 | Jakob | 366/131 |
| 3,879,021 | A | * | 4/1975 | Riley | 366/137.1 |
| 3,976,030 | A | * | 8/1976 | Ragsdale et al. | 118/303 |
| 4,117,195 | A | | 9/1978 | Swarbrick et al. | |
| 4,323,314 | A | * | 4/1982 | Kaiser-Wirz | 366/137.1 |
| 4,390,284 | A | * | 6/1983 | Hyde et al. | 366/165.5 |
| 4,531,673 | A | * | 7/1985 | Holland et al. | 239/113 |
| 4,688,945 | A | * | 8/1987 | Brazelton et al. | 366/156.1 |
| 4,728,475 | A | * | 3/1988 | Beck | 264/211 |
| 5,073,032 | A | * | 12/1991 | Berion et al. | 366/137.1 |
| 5,225,210 | A | * | 7/1993 | Shimoda | 425/145 |
| 5,609,831 | A | | 3/1997 | Kempter | |
| 5,660,466 | A | * | 8/1997 | Hopson et al. | 366/137.1 |
| 5,744,553 | A | | 4/1998 | Kempter | |
| 5,772,319 | A | * | 6/1998 | Pemberton et al. | 366/76.2 |
| 5,857,773 | A | * | 1/1999 | Tammelin | 366/178.1 |

(Continued)

FOREIGN PATENT DOCUMENTS

BE    822 849    4/1975

(Continued)

*Primary Examiner*—Charles E Cooley
(74) *Attorney, Agent, or Firm*—Thomas, Kayden, Horstemeyer & Risley, LLP; Todd Deveau

(57) ABSTRACT

Systems and methods for liquid dosing in blender systems are disclosed. An exemplary system includes one or more individual metering devices, each metering device including an individual material hopper for containing a granular material ingredient to be blended, a starve-fed mixing chamber coupled to the metering devices for receiving granular material ingredients from each metering device and mixing the ingredients, and a liquid ingredient dosing device disposed within the starve-fed mixing chamber for injecting a liquid ingredient into the path of the granular material ingredients as they fall through or out of the mixing chamber.

20 Claims, 6 Drawing Sheets

U.S. PATENT DOCUMENTS

| | | | | |
|---|---|---|---|---|
| 6,007,236 A | * | 12/1999 | Maguire | 366/141 |
| 6,045,255 A | * | 4/2000 | Ogier | 366/165.2 |
| 6,254,363 B1 | * | 7/2001 | Fink | 417/435 |
| 6,267,495 B1 | * | 7/2001 | Hurst | 366/76.91 |
| 6,367,959 B1 | * | 4/2002 | Kraus et al. | 366/137.1 |
| 6,551,402 B1 | * | 4/2003 | Renyer et al. | 118/303 |
| 6,595,681 B2 | * | 7/2003 | Chavis et al. | 366/167.1 |
| 6,669,358 B2 | * | 12/2003 | Shimoda | 366/76.2 |
| 6,733,708 B2 | * | 5/2004 | Chavis et al. | 264/78 |
| 7,390,119 B2 | * | 6/2008 | Maguire | 366/141 |
| 2007/0115753 A1 | * | 5/2007 | Landers et al. | 366/76.91 |
| 2007/0297272 A1 | * | 12/2007 | Kempter | 366/76.9 |

FOREIGN PATENT DOCUMENTS

| | | | |
|---|---|---|---|
| DE | 4313290 | | 10/1994 |
| EP | 0707030 A1 | * | 4/1996 |
| GB | 1 407 359 | | 9/1975 |
| JP | 53 133272 | | 11/1978 |
| JP | 06 057004 | | 3/1994 |
| JP | 06 143254 | | 5/1994 |
| JP | 08039543 A | * | 2/1996 |
| JP | 11 076781 | | 3/1999 |
| WO | 03/035346 A1 | * | 5/2003 |
| WO | 03/045542 A1 | * | 6/2003 |
| WO | WO 2006010291 A1 | * | 2/2006 |

* cited by examiner

SYSTEMS AND METHODS FOR LIQUID DOSING OF MATERIAL IN A BLENDER SYSTEM

FIELD OF THE INVENTION

The present disclosure relates generally to liquid dosing and, more particularly, to systems and methods for mixing liquid ingredients with granular material in blender apparatuses, and supplying the mixture to a material processing machine, such as an extruder.

BACKGROUND

Machines for producing cross-linked extruded products are generally known. For example, U.S. Pat. No. 4,117,195 discloses a screw extruder into which polymer granules are fed through a feed hopper. The other ingredients, typically cross-linkers, that must be added to the polymer granules are usually injected in liquid form into the lower portion of the feed hopper to the extruder or directly into the neck part of the extruder of this type of machine.

For complete and uniform cross-linking of polymers, it is desirable to achieve adequate mixing of all ingredients. However, this is precisely one of the main disadvantages of the known type of equipment. By merely injecting or dosing certain liquid additive ingredients into a flow of granular polymer material, which is passing through the extruder feed hopper or the neck of the extruder, a high liquid additive concentration is achieved only in the area around the injection site. In these systems, the mixture of liquid additive and granular polymer material must then be homogenized by means of the extruder worm gear with a complicated design as part of the extruder. In addition to the resulting unfavorable conditions for good cross-linking, this requires an extruder with a complex design that can be manufactured only at great expense.

A mixing device for premixing all the ingredients of the reaction mixture, namely the liquid cross-linking additive(s) and the granular polymer material, has been also disclosed in U.S. Pat. No. 5,609,831 issued to Kempter ("the '831 patent"). In the apparatus of the '831 patent, injection or dosing of one or more liquid additives occurs at right angles to the flow of the polymer and results in a preliminary mixing of the ingredients of the reaction mixture by means of the flow effect. The apparatus of the '831 patent, however, requires that the ingredients be further mixed mechanically with the help of a stirring rod. The requirement of mechanical mixing by the stirring rod adds additional complexity, time, and expense to the blending and extrusion process.

In view of at least these deficiencies, a need exists in the industry.

SUMMARY

Exemplary embodiments of the present invention include systems and methods for dosing of one or more liquid ingredients into a flow of granular material ingredients and mixing the liquid and granular ingredients for feed to a material processing machine such as an extruder. In some embodiments, a liquid injection device is used within a cascade mixing chamber of a gravimetric blender system in such a manner as to eliminate the need to mechanically mix the ingredients.

Other systems, devices, methods, features, and advantages will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
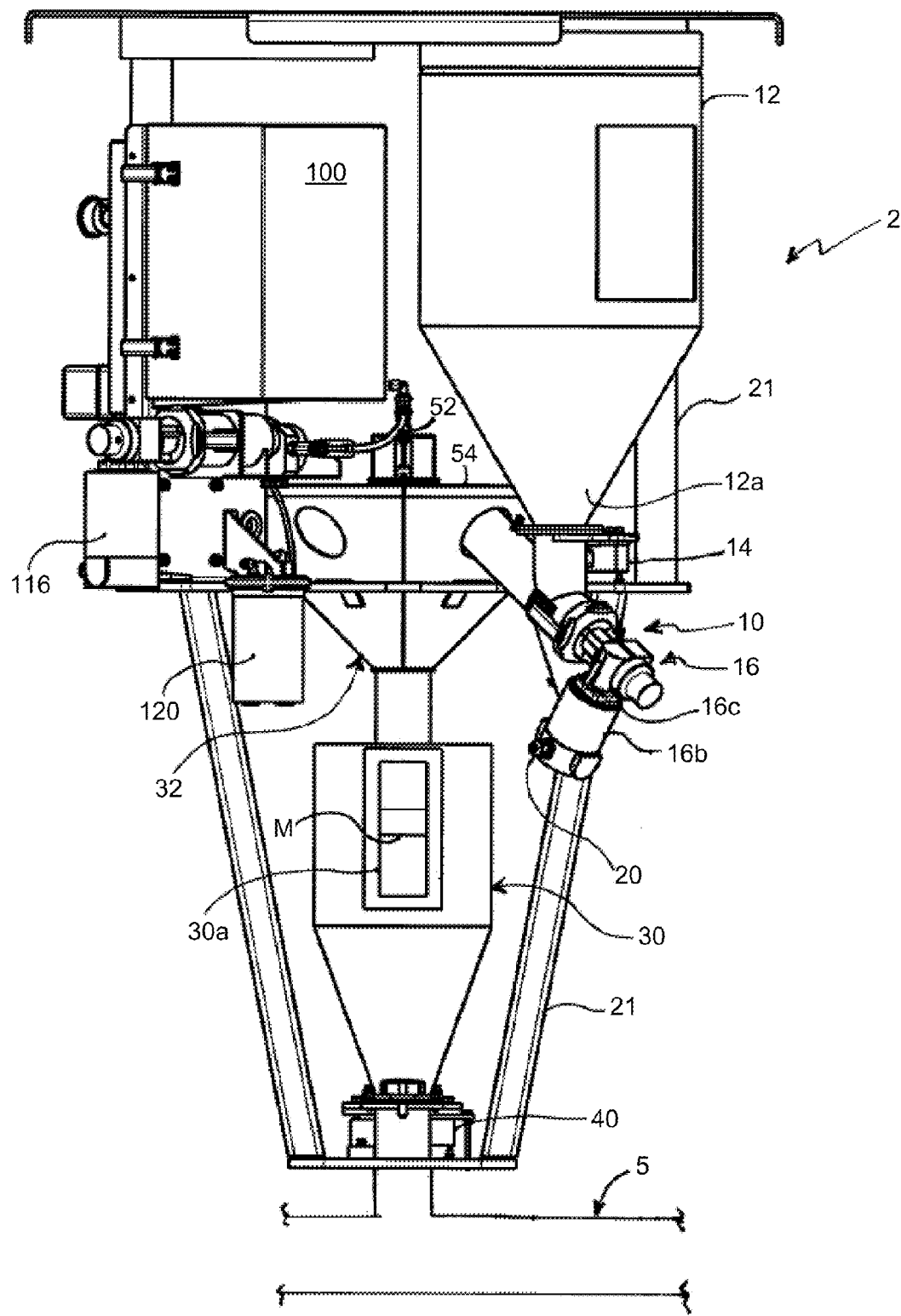
FIG. 1 is a side elevational view of an embodiment of a metering and blending system that includes the disclosed liquid dosing device.

Several embodiments of the present invention provide for dosing of one or more liquid additive ingredients into a flow of granular material ingredients in a gravimetric blender system, particularly for dosing a liquid additive, e.g., a cross-linker, into a flow of granular polymer ingredients to be fed to a material processing machine such as an extruder. Compared to traditional liquid dosing systems, which inject the liquid into the lower portion of an extruder feed hopper or directly into the neck part of an extruder, the liquid dosing disclosed herein results in more thorough mixing of the liquid additive and the granular polymer ingredients prior to being fed to the material processing machine. Additionally, the disclosed liquid dosing can be performed by a liquid injection device that can work in conjunction with a metering device in a gravimetric blender, and does not require an additional mechanical mixing mechanism. In this regard, the liquid dosing of the granular ingredients in the disclosed system can be performed more precisely and efficiently.

Reference is now made in detail to the description of the embodiments as illustrated in the drawings. While several embodiments are described in connection with these drawings, there is no intent to limit the invention to the embodiment or embodiments disclosed herein. On the contrary, the intent is to cover all alternatives, modifications, and equivalents.

Figure 2:
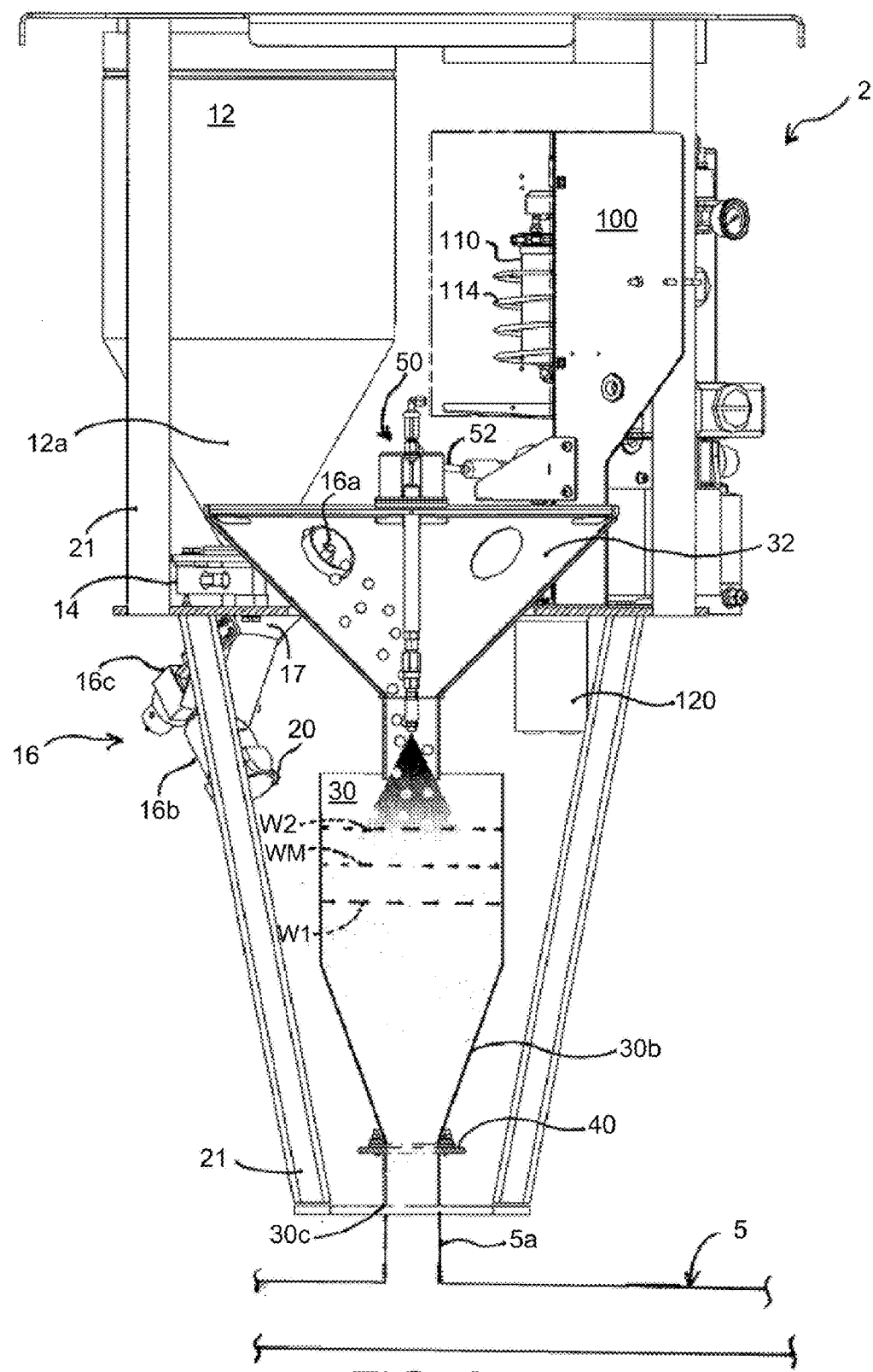
FIG. 2 is a perspective view of the system of FIG. 1 with a cut-away side elevation of an embodiment of a metering unit for a liquid injection device.

FIGS. 1-2 illustrate an exemplary embodiment of a system 2 for metering and blending different polymer material ingredients, such as different plastic pellets, granules, or particulates, for discharge to an extrusion machine 5. The base of the system is a continuous gravimetric blender for extruder throat mounted applications. The blender 2 comprises a plurality of individual metering devices 10 each associated with an individual material hopper 12 for containing a granular polymer material ingredient to be blended. While one such metering device 10 and material hopper 12 are illustrated, the system typically can include two or more of each, more typically, two to six metering devices 10 and associated material hoppers 12. The material hoppers 12 are each initially filled with a known starting weight of an individual material ingredient from a known supply hopper or vacuum receiver located thereabove (not shown). The system 2 can include a frame structure 21 for supporting various components of the system.

Each metering device 10 also comprises a weight measuring device 14 for determining the weight loss of the ingredient therein and an electrical motor-driven material discharge device 16 for discharging the ingredient therefrom at a controlled material discharge rate. The device 14 typically comprises a load cell operably connected to each individual material hopper 12 for monitoring the weight of the material ingredient therein at selected sampling times. The material discharge device 16 typically comprises a precision auger 16a driven by a variable speed DC electrical motor 16b through a gear reducer 16c. The auger 16a is operably associated with a discharge end 12a of each material hopper 12 for discharging the material ingredient therefrom at a known controlled material discharge rate through a feed conduit 17 into cascade mixing chamber 32.

Each metering device 10 also includes a connection to a digital computer control device 20. Each computer control device 20 is coupled to or interfaced with the weight measuring device 14 and the discharge motor 16b via interfaces (not shown). Each computer control device 20 receives weight signals from the weight measuring device 14 over time and determines a material discharge rate based on the weight signals from each respective material hopper 12. The weight signals are generated by the load cells as analog signals which are converted to digital signals by a conventional signal convertor (not shown) for input to the respective computer control devices 20.

As will become apparent below, each computer control device 20 controls the speed of the auger motor 16b of the associated material discharge device 16 so as to provide a controlled material discharge rate of each material ingredient from its associated material hopper 12 ultimately to a downcomer or common hopper 30 or directly to an extruder 5, extruder throat 5a, or an extruder hopper. Each computer control device 20 also controls filling of each hopper 12 to the initial known starting weight and also refilling thereof when a low supply or weight condition is sensed in each hopper 12.

The optional downcomer 30 is of the mass flow weigh type and is adapted to receive the material ingredients discharged from the individual metering devices 10 via a cascade mixing chamber 32 where the ingredients are gravimetrically cascaded and mixed to form a substantially homogeneous blend or mixture for reception by the downcomer 30. The downcomer 30 has a cylindrical, preferably transparent wall 30a to enable viewing of the level of the blend M of material ingredients in the downcomer 30. The downcomer 30 serves to preserve the blended ingredients for feed to the extruder without demixing. In one embodiment, the downcomer 30 is located to enable the blend M to be discharged directly to the underlying throat 5a of the extrusion machine 5 (or other material processing machine). For this purpose, the downcomer 30 includes a lower conical discharge end 30b terminating in a lower, open discharge opening 30c to provide flow of the blend M to the extrusion machine 5. In one embodiment, the downcomer 30 is coupled to a surge hopper (not shown) positioned directly above the extruder throat 5a and directly below the downcomer 30.

In the embodiment of the system 2 that includes the downcomer 30, a weighing device 40, such as a load cell, is operably connected to the downcomer 30 at the discharge end 30b. The weighing device 40 detects the weight of the blend M therein at selected sampling times. A master digital computer control unit (not shown) is coupled via an interface to the weighing device 40 of the downcomer 30 for receiving the weight signals therefrom (analog to digital converted signals). Any change in weight of the blend M in the downcomer can be determined from the weight signals over the selected sampling times. The master computer control unit is also coupled via interfaces to the computer control devices 20 that monitor and supervise continually the overall operation of the metering units 10. For example, the master computer control unit continually periodically receives the weight signals from the computer control devices 20 and determines material discharge rates of individual material ingredients from the individual metering devices 10 and controls those material discharge rates as needed to maintain a desired recipe or proportions of the material ingredients in the blend M and to provide an overall through put rate of the blend to the downcomer 30 at about the rate at which the blend is taken away by the extrusion machine 5.

In addition, the master computer control unit determines the plastic material discharge rate of the blended ingredients to the extrusion machine 5 based on the sum of the determined material discharge rates of the individual metering devices 10 to the downcomer 30 and a determined change in weight of the blend M of the ingredients in the downcomer over selected time periods. The master computer control unit communicates via the interfaces with the individual computer control devices 20 to control the material discharge rates of the metering devices 10 to the downcomer 30 as needed to maintain a preset recipe or ratio of the material ingredients in the blend M in the downcomer 30 as well as to maintain a substantially constant head (weight) of the blend M in the downcomer 30 over the throat 5a at the determined plastic material discharge rate of the blend M to the extrusion machine 5. Thus the master computer control controls the overall feed rates of individual ingredients to the downcomer 30 in relation to the rate at which the extruder withdraws blend M from the downcomer.

So-called steady window limits W1, W2 (illustrated schematically on the downcomer 30 in FIG. 2 for illustrative purposes) can be preset in the memory of the master computer control unit. These steady window limits define a range or window of upper and lower blend weights to be maintained in the downcomer 30. A median hopper weight WM can also be preset in the memory of the master computer control unit corresponding to the center point of the steady window range. The master computer control can be programmed to attempt at all times during material processing (extrusion) to maintain the weight of blend M in the downcomer 30 stabilized at a near equilibrium weight relative to this center point hopper weight WM by controlling the material discharge rates of the metering units 10 in response to the material processing rate of the machine 5. In effect, this will maintain a substantially constant head or weight of the blended material ingredients M over the extruder throat 5a during the extrusion operation. Thus, the downcomer 30 operates on a "flood-feed" basis, where the material blend M, already coated with and/or mixed with the additive from the liquid dosing device 50, accumulates and resides in the downcomer 30 between window limits W1 and W2.

In the practice of the method, the individual plastic material ingredients from the respective individual material hoppers 12 are discharged to the downcomer 30 by the discharge devices 16 via the cascade mixing chamber 32 at a controlled material discharge rate. The cascade mixing chamber 32 operates on a "starve-feed" basis, e.g., the material freely falls through the cascade mixing chamber 32 and does not accumulate in the cascade mixing chamber 32. Thus, the residence time of the material in the cascade mixing chamber 32 is substantially the amount of time it takes for the material to fall through the mixing chamber, based on gravity and the rate at which the metering devices 10 discharge material into the cascade mixing chamber 32. When at least two separate metering devices 10 are present, typically discharging at least two different types of material, the different types of material are effectively mixed as they fall through the cascade mixing chamber 32 without need for an additional mechanical mixer. By using a starve-feed system with each of the metering devices 10, different materials having different properties or characteristics can be introduced to the cascade mixing chamber 32 at different rates, thus determining the composition of the final extruded product.

The cascade mixing chamber 32 is also designed to house at least one liquid dosing device 50, as illustrated in FIG. 2, which doses the granular material fed into the system via the metering units 10 with a liquid additive ingredient. In one embodiment, the material blend M comprises plastic polymer particulates or pellets and the liquid additive is a cross-linker for the polymer ingredients.

The liquid dosing device 50 is operably connected to a liquid feed line 52, and is suspended in the cascade mixing chamber 32. Although the liquid dosing device 50 is oriented in a substantially vertical position with respect to the cascade mixing chamber 32 in the embodiment depicted in FIG. 2, in other embodiments the liquid dosing device 50 can be oriented in a substantially horizontal position or at an angle with respect to the cascade mixing chamber 32. Multiple liquid dosing devices 50 can be housed within the cascade mixing chamber 32, each of which can be operably connected to the same or different liquid feed line(s) 52. The liquid dosing device 50 can optionally be operably connected to a purge line (not shown). In the embodiments with multiple liquid dosing devices 50, each of the liquid dosing devices 50 can be operably connected to the same or different purge line(s). The purge line(s) allow for purging or cleaning of the liquid feed line(s) when the system is not in use. Embodiments of the configuration and operation of the liquid dosing device 50 will be described in further detail below.

Figure 3:
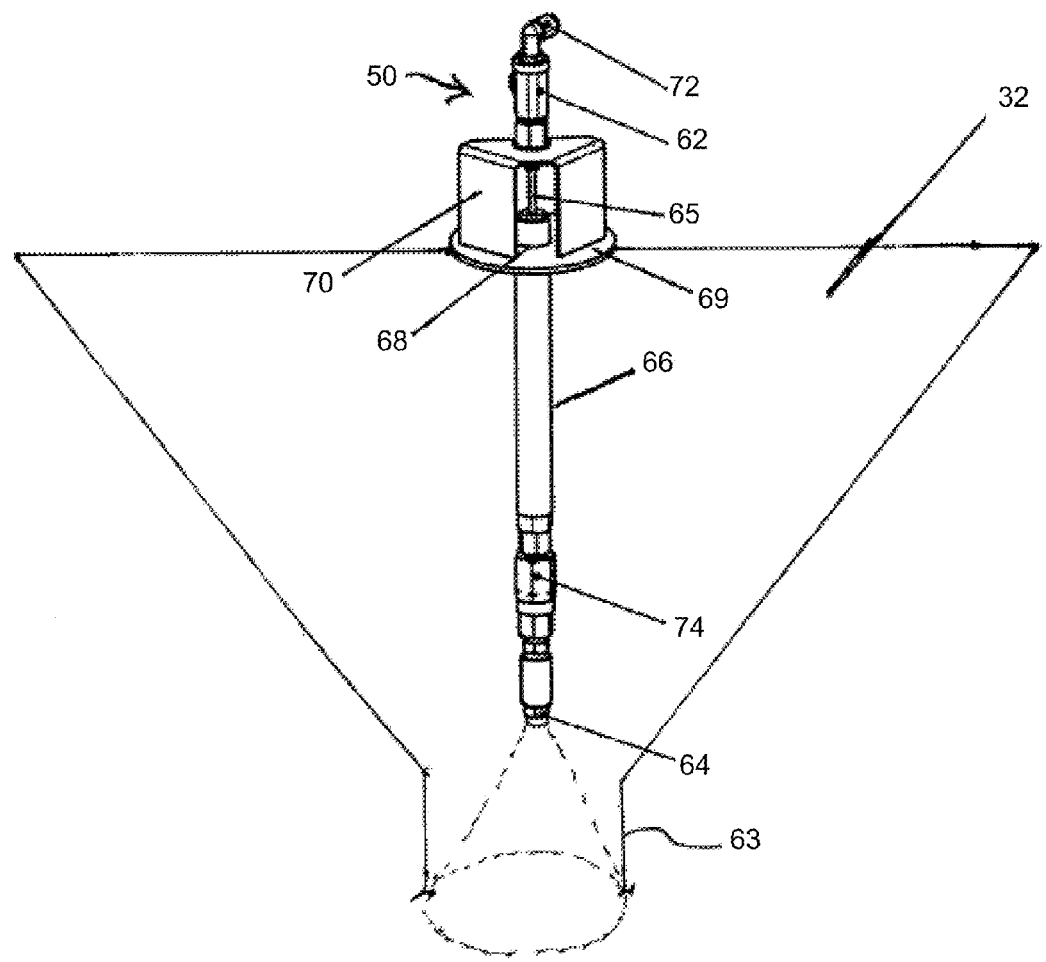
FIG. 3 is a perspective view of an embodiment of the disclosed liquid injection device used on the system of FIG. 1.

The disclosed apparatuses, systems, and methods provide a material blend that is dosed with a liquid additive prior to feed to the extruder, without the need for an additional mixing mechanism beyond the starve-fed cascade mixing chamber 32. FIG. 3 is a diagram illustrating an exemplary embodiment of the liquid injection device 50 depicted in FIG. 2. The liquid injection device 50 includes a liquid inlet port 62, into which the liquid additive is introduced, and a nozzle 64, out of which the liquid additive is sprayed. In one embodiment, the liquid additive is sprayed out of the nozzle 64 in a fog that is a fan-shaped cone that encompasses the entire inner diameter of the outlet 63 of the cascade mixing chamber 32. The liquid inlet port 62 and the nozzle 64 are in fluid communication via a supply line 65 that is concentrically located within a post 66. The embodiment depicted in FIG. 3 illustrates the liquid injection device 50 in a vertical orientation. In other embodiments, multiple liquid injection devices 50 can be used in a horizontal orientation to create a fog of the liquid additive through which the material blend M is starve-fed as it passes through and out of the cascade mixing chamber 32 to downcomer 30.

In one embodiment, the liquid inlet 62 is secured to a plate 69 via a flange or collar 70. The post 66 slidably extends through an aperture 68 in the plate 69. The size and configuration of the fog sprayed from the nozzle 64 will vary based on the physical and chemical properties of the liquid additive (e.g., viscosity, molecular weight, etc.). By variably adjusting the position of the post 66 through the aperture 68, the size and location of the fog sprayed from the nozzle can be adjusted in relation to the outlet 63 of the cascade mixing chamber 32. One manner by which the position of the post 66 can be adjusted is by inserting or removing shims (not shown) between plate 69 and a supporting plate 54 (FIG. 1) of the cascade mixing chamber.

The post 66 can optionally be communicatively coupled to the nozzle 64 via a check valve 74, where the check valve 74 is configured to partially cut off the flow of liquid from the nozzle 64 or completely cut off the liquid without dripping. Thus the rate of flow of liquid additive from the nozzle 64 can be coordinated with the rate of introduction of material from the metering devices 10, or if desired, can be completely shut off for certain runs or at the end of certain runs. For example, where the material blend M accumulates in the downcomer because material is delivered to the downcomer at a rate that exceeds the rate at which the extruder takes away the blend M from the downcomer 30, it may be desirable to temporarily discontinue metering the granular and liquid ingredients to the downcomer.

When the blender system 2 is turned off, or if one type of liquid additive is being substituted for a different liquid additive, it may be desirable to purge the components (e.g., lines, ports, nozzle, etc.) of the liquid dosing device 50 with a fluid that is non-reactive with the liquid additive. As used herein, the term "fluid" encompasses any gas, liquid, or mixture of gas and liquid, various types of aerosols, and particulate matter that may be entrained within such fluids. Exemplary purge fluids include, for example, inert and non-reactive gases such as nitrogen and argon, and solvents for the liquid additive such as liquid alcohol. In one embodiment, the liquid dosing device 50 includes a purge inlet 72 fluidly coupled to the purge line 54 that introduces the purge fluid to the liquid dosing device 50.

Where a reactive liquid additive is involved, it can be advantageous to provide a blanket of a non-reactive gas or gases in the cascade mixing chamber 32 and also in the downcomer 30. Purge inlet 72 can be used to supply the non-reactive gas or gases into the cascade mixing chamber and downcomer.

Figure 4:
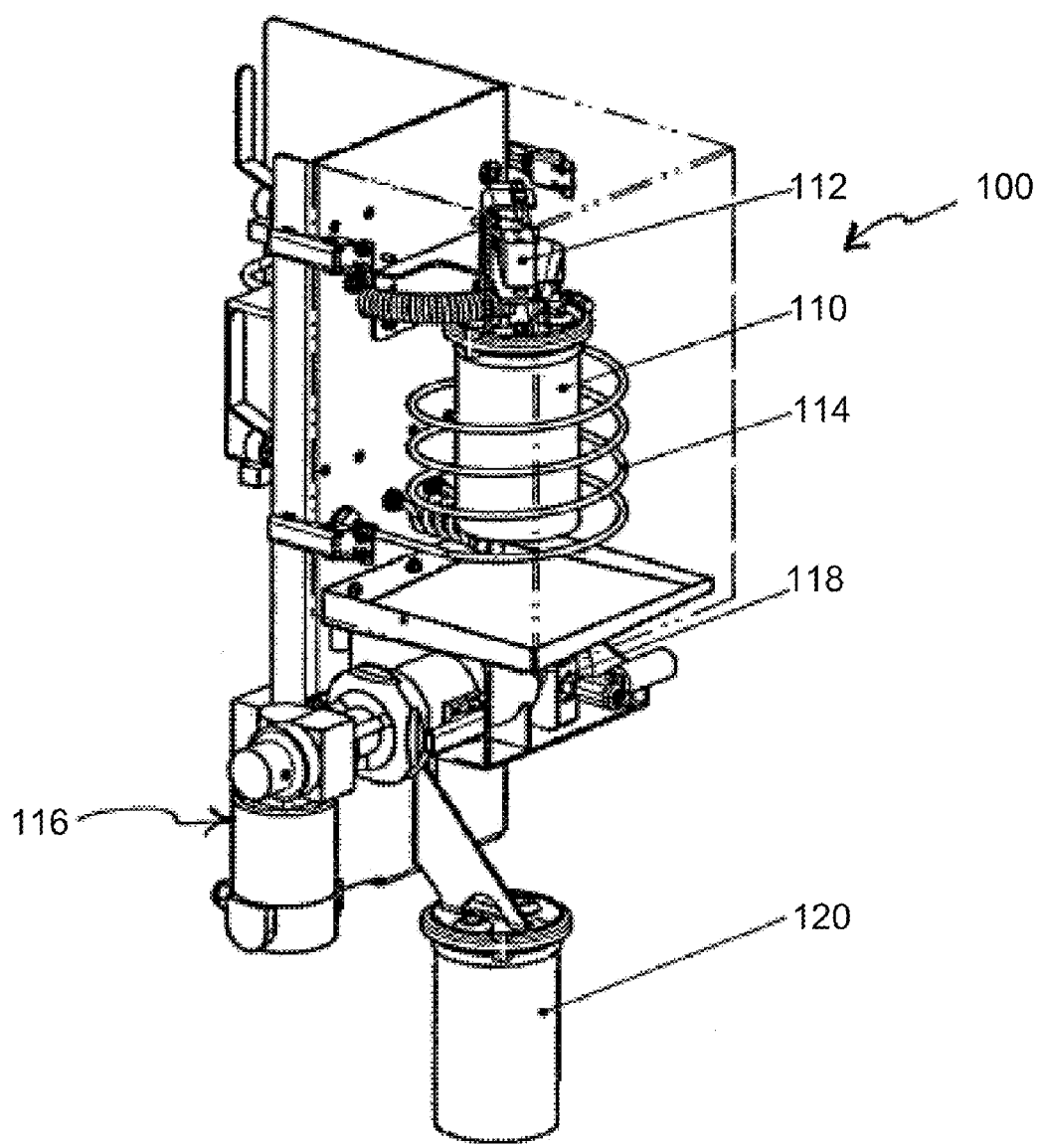
FIG. 4 is a cut-away view of an embodiment of a metering unit for the liquid injection device of FIG. 3.

FIG. 4 is a cut-away view of an exemplary embodiment of a metering unit 100 for the liquid injection device 50 of FIG. 3. One or more such liquid metering units can be provided. Metering unit 100 serves to deliver controlled amounts of the liquid ingredient to be dosed through the liquid injection device 50. The metering unit 100 includes a reservoir or weigh hopper tank 110 for the liquid to be dosed and weight measuring device 112, such as a load cell, for providing readings at selected time periods of the weight of liquid ingredient in the weigh hopper tank 110. Cooling coils 114 provide cooling for the weigh hopper tank 110 for those liquid dosing ingredients that need to be maintained at a temperature below ambient. A liquid pump 116 and associated drive motor 118 are provided to deliver the liquid dosing ingredient from the weigh hopper tank 110 to the liquid injection device 50 by way of appropriate tubing to liquid inlet port 62 of the liquid dosing device 50. Additionally an overflow tank 120 is provided in the case, for example, that a leak develops in the liquid metering unit. The cooling coils can be provided with a cooling fluid by way of an appropriate inlet valve. The cooling fluid can, for example, be cold water or any suitable refrigerant from a separate refrigerant cooling device.

The liquid dosing weighing device 112 is operably connected to the liquid weigh hopper tank 110. The weighing device detects the weight of the liquid dosing ingredient in the weight hopper tank at selected sampling times. The weighing device is further coupled via an interface to the aforementioned master digital computer control unit. The master computer control unit continually periodically receives weight signals from the liquid dosing weighing device 112 and determines periodic discharge rates of the liquid dosing ingredient from its associated metering unit. The master computer control unit can then combine the weight signals received from the weighing device 112 for the liquid metering unit with weight signals from the weighing devices associated with the individual metering devices and also the weighing device 40 associated with the downcomer 30 for coordinating the rate of metering or dosing the liquid ingredient with the rate of metering the individual ingredients in order to maintain the desired ratio of dosing of liquid ingredient(s) to the individual particulate or granular ingredients and also to control the overall throughput rate of all of the ingredients to the downcomer 30.

Figure 5:
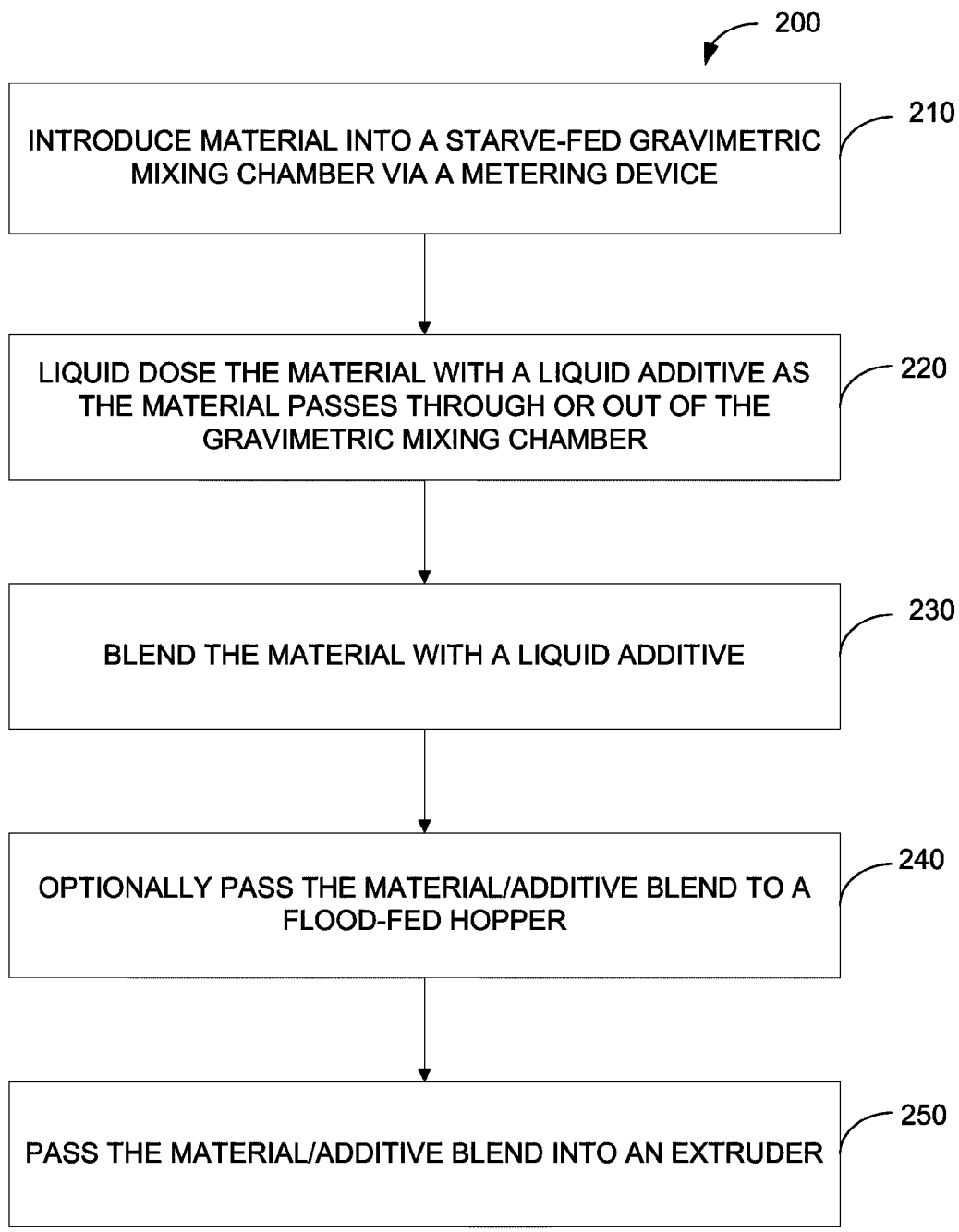
FIG. 5 is a flowchart illustrating an embodiment of a method for liquid dosing of particulate matter in a blender system.

FIG. 5 is a flowchart illustrating an embodiment of a method 200 for liquid dosing in blender systems. As shown in FIG. 4, some embodiments of the method 200 include the steps of introducing a pelletized, particulate, or granular material into a starve-fed gravimetric mixing chamber via at least one metering device (210); liquid dosing the material with a liquid additive into the path of the material ingredients as the material ingredients are starve-fed through or out of the gravimetric mixing chamber (220); blending the material with the liquid additive (230); and thereafter passing the material/additive blend into an extruder (250). Optionally the material/additive blend is passed to a flood-fed hopper (240), such as downcomer 30, before passing it into a material processing machine such as an extruder.

Figure 6:
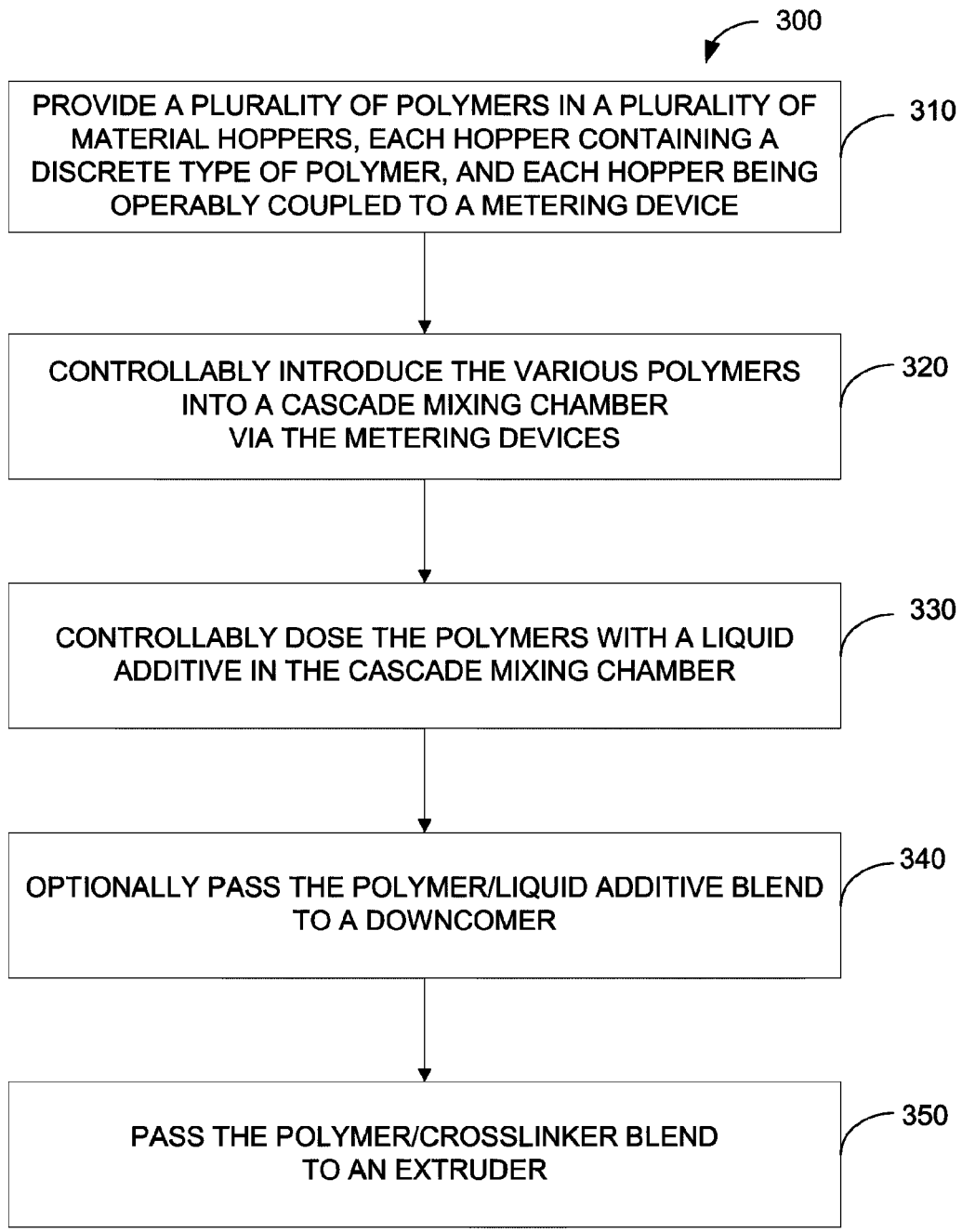
FIG. 6 is a flowchart illustrating an embodiment of a method for liquid dosing of particulate matter in a blender system.

FIG. 6 is a flowchart showing another embodiment of a method 300 for liquid dosing in blender systems. As shown in FIG. 5, some embodiments of the method 300 include the steps of providing a plurality of types of pelletized, particulate, or granular polymers in a plurality of material hoppers, wherein each hopper contains a discrete type of polymer and each hopper is operably coupled to a metering device (310); controllably introducing the various polymers into a cascade mixing chamber via the metering devices (320); controllably dosing the polymers with liquid additive such as a crosslinker in the cascade mixing chamber, thereby blending the polymers with each other and with the crosslinker (330); optionally passing the polymer/crosslinker blend to a downcomer (340); and thereafter passing the polymer/crosslinker blend into an extruder (350).

As shown in the processes of FIGS. 5 and 6, introducing the liquid additive or crosslinker at the same time the polymer granules are blended, rather than later in the process, conserves energy and eliminates the need for a second mixing step. Also, unlike other liquid dosing systems, the rate of liquid dosing of the polymers can be controlled to coincide with the rate of introduction of each polymer into the gravimetric blender system.

Any process descriptions or blocks in flow charts should be understood as representing modules or steps in the process, and alternate implementations are included within the scope of the preferred embodiment of the present invention in which functions may be executed out of order from that shown or discussed, including substantially concurrently or in reverse order, or substantially simultaneously, depending on the functionality involved, as would be understood by those reasonably skilled in the art of the present invention.

Although exemplary embodiments have been shown and described, it will be clear to those of ordinary skill in the art that a number of changes, modifications, or alterations to the invention as described may be made. For example, while a specific configuration for the particulate-matter-delivery system is shown in FIGS. 1 and 2, it should be appreciated that the disclosed liquid dosing can be applied to other particulate-matter-delivery systems. Additionally, while particular duty cycles are provided in several embodiments, it should be appreciated that the timing may be varied to provide optimal activation and deactivation periods for the liquid dosing device 50. All such changes, modifications, and alterations should therefore be seen as within the scope of the disclosure.

At least the following is claimed:

1. A blender system comprising:
one or more individual metering devices, each metering device comprising an individual material hopper for containing a granular polymer material ingredient to be blended;
a starve-fed mixing chamber coupled to the metering devices, the starve-fed mixing chamber configured to receive the granular material ingredients from each metering device and mix the ingredients, wherein the starve-fed mixing chamber is a gravimetric cascade mixing chamber, configured to allow the ingredients to freely fall through and out of the starve-fed mixing chamber by gravity and not accumulate in the starve-fed mixing chamber;
a liquid ingredient dosing device disposed within the starve-fed mixing chamber for injecting a liquid ingredient into the path of the granular material ingredients as they fall through or out of the starve-fed mixing chamber.

2. The system of claim 1, further comprising a downcomer adapted to receive the mixed material ingredients discharged from the individual metering devices via the starve-fed mixing chamber, wherein the downcomer is located to enable the mixed material ingredients to be discharged directly to an underlying material processing machine.

3. The system of claim 1, wherein at least one liquid dosing device is oriented in a vertical position with respect to the starve-fed mixing chamber.

4. The system of claim 1, wherein the liquid dosing device is positioned in the starve-fed mixing chamber in a manner whereby a liquid fog expelled from the liquid dosing device encompasses an inner diameter of an outlet of the starve-fed mixing chamber.

5. The system of claim 1, wherein the granular material is pelletized, particulate or granular polymer material and wherein the starve-fed mixing chamber is configured such that the residence time of the granular material in the starve-fed mixing chamber is substantially the amount of time it takes for the granular material to fall through the starve-fed mixing chamber based on gravity.

6. The system of claim 1, comprising at least two individual metering devices.

7. The system of claim 1, wherein the mixing in the starve-fed mixing chamber occurs without mechanical agitation.

8. A method of liquid dosing in a blender system comprising the steps of:
providing one or more individual metering devices, each metering device comprising an individual material hopper for containing a granular polymer material ingredient to be blended; a starve-fed mixing chamber operably coupled to the metering devices, the starve-fed mixing chamber configured to receive the granular material ingredients from each metering device and mix the ingredients, wherein the starve-fed mixing chamber is a gravimetric mixing chamber that operates on a basis where the ingredients to freely fall through and out of the starve-fed mixing chamber by gravity and do not accumulate in the starve-fed mixing chamber; and a liquid ingredient dosing device disposed within the starve-fed mixing chamber for injecting a liquid ingredient into the path of the granular material ingredients as they fall through or out of the starve-fed mixing chamber;

introducing granular material ingredients into the starve-fed mixing chamber via at least one metering device; and liquid dosing the granular material ingredients with a liquid additive as the granular material ingredients pass through or out of the mixing chamber.

9. The method of claim 8, wherein the granular material is a pelletized, particulate, or granular polymer material.

10. The method of claim 8, further comprising providing as the granular material ingredients a plurality of types of pelletized, particulate, or granular polymer materials in a plurality of material hoppers, wherein each hopper contains a discrete type of polymer material and each hopper is operably coupled to a metering device.

11. The method of claim 10, wherein the step of introducing the pelletized, particulate, or granular polymer materials into the starve-fed gravimetric mixing chamber comprises introducing pelletized, particulate, or granular polymer materials into the starve-fed gravimetric mixing chamber via a plurality of metering devices.

12. The method of claim 10, wherein the step of liquid dosing the material with the liquid additive comprises controllably dosing the polymers with a liquid cross-linker, thereby blending the polymers with each other and with the crosslinker.

13. The method of claim 8, further including the step of passing the material/additive blend from the starve-fed gravimetric mixing chamber to a flood-fed hopper.

14. The method of claim 13, wherein the step of passing the material/additive blend to a flood-fed hopper comprises subsequently passing the material/additive blend to a material processing machine.

15. The method of claim 14, wherein the material processing machine is an extruder.

16. The method of claim 8, further comprising passing the material/additive blend into a material processing machine.

17. The method of claim 8, further including the step of controlling the amount of liquid additive dosed in relation to the amount of granular material introduced into the mixing chamber.

18. The method of claim 8, wherein the granular material is pelletized, particulate or granular polymer material and wherein the starve-fed mixing chamber operates on a basis where the residence time of the granular material in the starve-fed mixing chamber is substantially the amount of time it takes for the granular material to fall through the starve-fed mixing chamber based on gravity.

19. The method of claim 8, wherein at least two individual metering devices are provided.

20. The method of claim 8, wherein the mixing in the starve-fed mixing chamber occurs without mechanical agitation.

* * * * *